No. 613,304.    Patented Nov. 1, 1898.
E. PIGGOTT.
ANIMAL TRAP.
(Application filed Nov. 29, 1897.)
(No Model.)
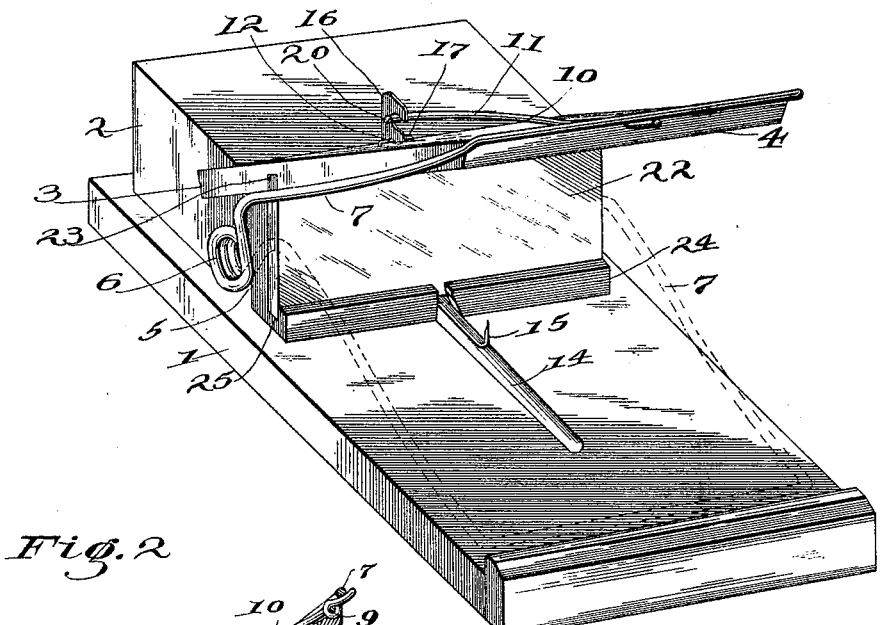
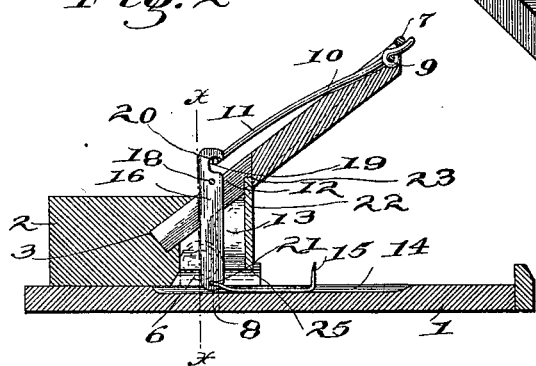
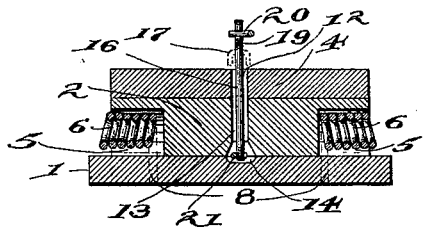
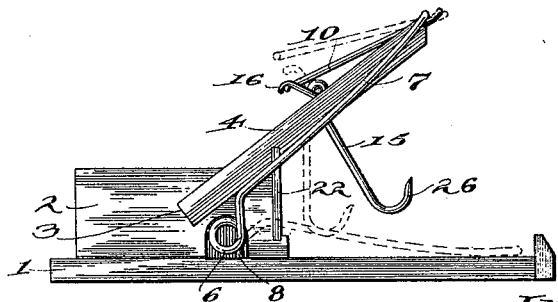
Witnesses:-
Inventor
Edmund Piggott
By his Atty.

UNITED STATES PATENT OFFICE.

EDMUND PIGGOTT, OF DRESDEN, CANADA.

ANIMAL-TRAP.

SPECIFICATION forming part of Letters Patent No. 613,304, dated November 1, 1898.

Application filed November 29, 1897. Serial No. 660,074. (No model.)

*To all whom it may concern:*

Be it known that I, EDMUND PIGGOTT, a citizen of the Dominion of Canada, residing at Dresden, in the Province of Ontario, Canada, have invented certain new and useful Improvements in Animal-Traps, (patented in Canada October 29, 1897, No. 79,270,) of which the following is a specification.

This invention relates to an animal-trap, and has especial relation to a trap for catching rats, mice, and small animals generally.

The object of the invention is to provide an inexpensive trap which will combine with a spring-actuated deadfall a reflecting-surface to act as a bait supplemental to the bait upon the trigger.

The invention consists in the parts and combination of parts shown in the drawings, described in the specification, and more particularly pointed out in the claims.

In the drawings, Figure 1 is a perspective view of a trap, illustrating my invention, the deadfall being shown in a raised position in full lines and in a lowered position in dotted lines. Fig. 2 is a longitudinal sectional elevation of the trap. Fig. 3 is a transverse sectional view of the same, the line of section being taken at a point indicated by the line x x, Fig. 2. Fig. 4 is a longitudinal sectional elevation of a modified form of trap especially adapted for catching small animals, such as mice, &c.

Referring to the drawings, in which like numerals of reference indicate corresponding parts through the several views, 1 designates the base of the trap, having secured thereon, upon the rear end thereof, a transversely-arranged block 2. Extending transversely of the block, at an incline in the forward face thereof, is a recess 3, into which seats the lower end of an inclined top 4. In the under side of the block, at a point near the forward edge thereof and upon each side thereof, are recesses 5 of sufficient diameter to receive and house the coiled ends 6 of the deadfall 7, the said coiled ends acting as a spring to actuate the deadfall, the ends terminating in a straight portion 8, adapted to be passed through the base, by which means the spring and deadfall are secured to the base. The deadfall comprises a bail-shaped structure of a contour similar to the contour of the free end of the inclined top 4 and of a size to pass the top when the bail is raised, as shown in Fig. 1. Pivotally secured upon a pivot-pin 9, located at the upper edge of the top, is a lever 10, the upper end of which passes under the deadfall when raised, the opposite end 11 projecting downwardly to a point adjacent to the joinder of the top to the block 2. Beneath the end 11 of the lever 10 the top is slotted, as at 12, the block is cut away, as at 13, and the base is grooved, as at 14, to receive and house the trigger 15 and the catch 16.

The catch is pivotally secured to the top by means of a staple 17, passing through an orifice 18 in the catch and into the top, the upper end describing an arc to and from the lower end of the lever 10. The catch is provided with a recess 19 in its front face, in which the angled end 20 of the lever 10 engages when the trap is set.

The trigger 15 is pivotally secured to the catch at 21 and lies loosely in the groove 14, the outer end being bent upwardly to receive the bait.

As thus far described the operation will be readily apparent. When the deadfall is raised, the rear end of the lever is raised to allow the deadfall to pass the forward end thereof and is then lowered to permit the said forward end to engage beneath the deadfall, the opposite end being engaged by the catch. This operation draws the trigger back, in which position the trap is set. When an animal in attempting to remove the bait from the trigger pulls the trigger outwardly, the lever is released, releasing the deadfall, which falls with sufficient velocity to kill the animal or to hold the animal in the trap.

In order to render the trap more effectual for the purpose for which it is intended, I have provided a supplemental bait, which comprises a mirror 22, carried by the trap and located in rear of the bait, the object of which is not only to attract the animal's attention to the trap, but to cause the representation of a like animal after the bait, which will serve as an incentive to the animal to approach and take the bait. To effect this result, the top is grooved laterally, as at 23, and the lower front edge of the block is formed with an extension 24, having a laterally-arranged groove 25, in which groove and the groove 23 the edges of the mirror fit, the mirror being held from side movement by the arms of the deadfall, which have a movement along the sides of the mirror.

As shown in Fig. 4, I have illustrated a modification of the trap which comprises a trap especially adapted for small animals, such as mice, &c. In this construction the trigger is combined with the catch, the lower end of the catch being bent, as at 26, to receive the bait, the catch in this instance requiring a push to release the lever and allow the deadfall to descend.

What I claim is—

1. A trap comprising a base, a top carried thereby and projecting forwardly over the same, a deadfall and means for holding the same normally in a raised position, and a mirror interposed between the base and top whereby it is held from vertical movement and between the arms of the deadfall whereby it is held from lateral movement, substantially as described.

2. A trap comprising a base, a block secured thereon having an inclined transverse groove in its front face, a top secured in the groove having its free end projecting over the base, a lateral groove in the under side of the top and in the lower edge of the block, a mirror having its edges seated in the said grooves, a deadfall having a movement partially across the ends of the mirror whereby the mirror is held from end movement, and means for holding the deadfall in a raised position, substantially as described.

In testimony that I claim the foregoing as my invention I have signed my name in the presence of two subscribing witnesses.

EDMUND PIGGOTT.

Witnesses:
B. KRUEPER,
B. FERSTL.